Feb. 3, 1959 S. E. SCHROEDER 2,871,718
TRANSMISSION WIRE OR CORE FOR CONTROL MECHANISM
Filed July 5, 1955
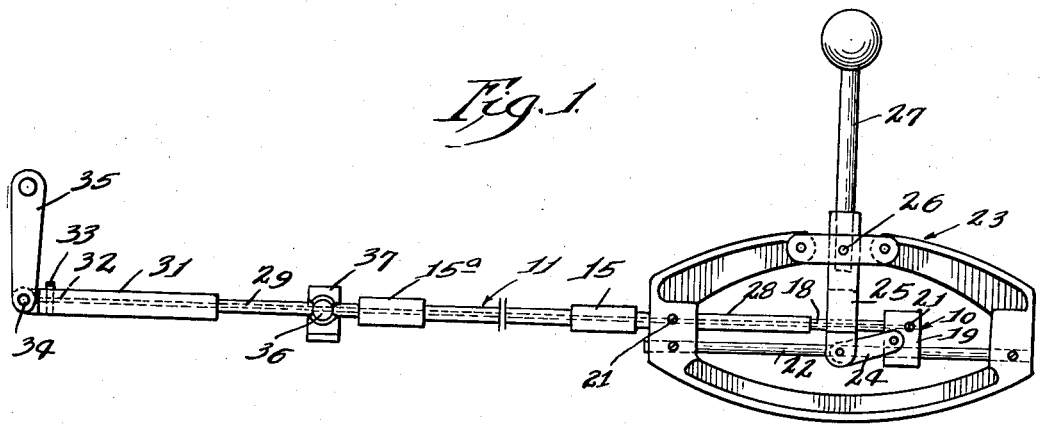
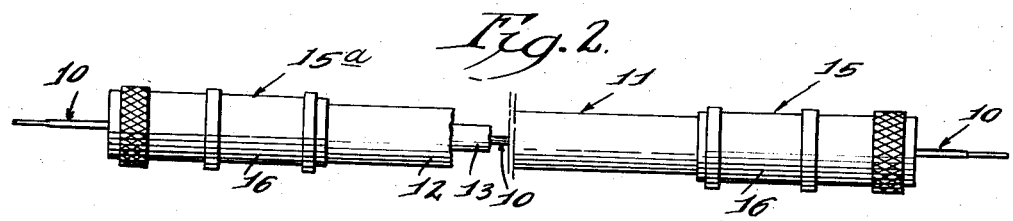
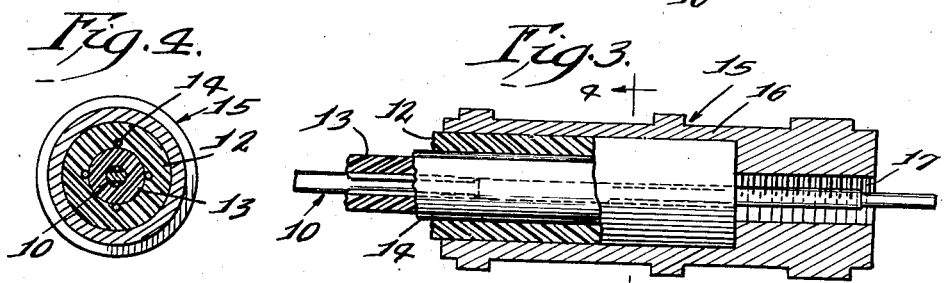
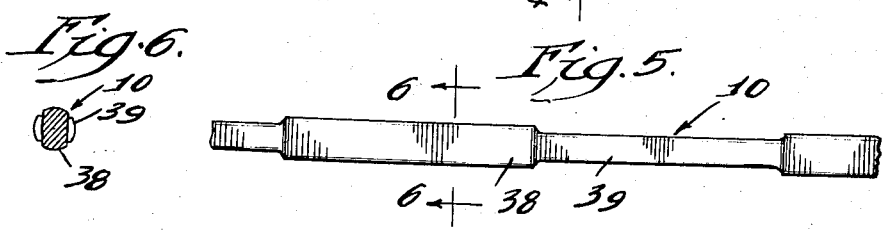
Inventor.
Simon E. Schroeder.
By Wilson & Geppert
Attorneys.

United States Patent Office 2,871,718
Patented Feb. 3, 1959

2,871,718

TRANSMISSION WIRE OR CORE FOR CONTROL MECHANISM

Simon E. Schroeder, Oshkosh, Wis., assignor, by mesne assignments, to Fox River Manufacturing Company, Oshkosh, Wis., a corporation of Wisconsin Application July 5, 1955, Serial No. 520,021

10 Claims. (Cl. 74—501)

The present invention relates to flexible transmission for controlling the operation or actuation of suitable mechanism from a remote station, and more particularly to a novel transmission wire or core for such a cable.

Flexible push-pull or transmission cables are effectively employed for the remote control of or for the transmission of power to any mechanism capable of being actuated or operated at a point remote from its location. Cables of the disclosed type are capable of use in controlling the throttle, steering or shift mechanism of motors for outboard and inboard motor boats, for use in automobiles, such as in the operation of chokes, for throttle controls, speedometers, ignition systems, power take-offs and for numerous other uses where a control mechanism of the disclosed type is susceptible of use.

Among the objects of the present invention is the provision of a novel transmission wire or control core for control mechanism of the type in which the transmission wire or core is moved longitudinally in its sheathing or housing when actuated by a push or pull on one end of the wire or core to thereby operate or discontinue operation of the mechanism controlled thereby.

The present invention further comprehends the provision of a novel transmission wire or control core in which the wire or core is so formed as to provide multiple adjoining flattened portions or sections of decreased cross sections with the adjoining sections or portions disposed at an angle with each adjacent section or portion.

Another important object of the present invention is the provision of a novel transmission wire or control core for the flexible cable of a control mechanism, said wire or core being so contoured as to substantially reduce the frictional contact between this wire or core and its encompassing housing and thereby assure easy and positive operation and control of the mechanism being operated thereby.

A further object of the present invention is the provision of a novel method and manner of so forming or contouring the novel transmission wire or control core as to provide between it and its encompassing sheathing multiple pockets or spaces for containing and retaining a lubricant whereby objectionable frictional resistance to longitudinal movement of the transmission wire or control core is reduced to a minimum. This is of particular importance where the cable is bent about relatively sharp curves and where the cable is employed in long lengths in which the continuous contact or bearing of the core wire causes substantial friction that results in difficult or inefficient operation.

The invention further comprehends the provision of a novel transmission wire or control core that has adjacent portions or sections thereof flattened after their thickness reduce and with adjacent portions or sections flattened or disposed in different planes. In the illustrative embodiment the adjacent sections or portions of decreased cross section are shown as disposed at a substantially right angle to each other.

By this novel construction and arrangement, the resulting transmission wire or control core has substantially greater strength than the usual round wire and also has greater flexibility to follow the contour of the encompassing sheathing of the flexible cable in which it is housed.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a fragmentary view in side elevation of a remote control flexible transmission cable and illustrating one embodiment of a controlling mechanism for manual actuation or operation of the transmission wire or core of the cable to control the operation of any suitable mechanism located remote therefrom.

Fig. 2 is a fragmentary enlarged view of the flexible transmission cable with the control or transmission wire or core projecting therethrough for connection at one end to the actuating mechanism and at the other end to the actuated mechanism.

Fig. 3 is a fragmentary enlarged view in vertical cross section taken longitudinally through the cable and one of its end fittings or ferrules with the novel transmission wire or control core longitudinally movable therein.

Fig. 4 is a view in vertical cross section taken in a plane represented by the line 4—4 of Fig. 3 and viewed in the direction of the arrows.

Fig. 5 is a fragmentary enlarged view of a section of the novel transmission wire or control core.

Fig. 6 is a view in vertical cross section taken in a plane represented by the line 6—6 of Fig. 5 and viewed in the direction of the arrows.

Referring more particularly to the disclosure in the drawing and to the novel embodiment of a transmission wire or control core 10 for remotely controlling any suitable operating mechanism, such as throttles, shift or steering mechanism for motor boats, for throttles and other controls for automobiles and for other control operations where a transmission cable housing a longitudinally movable or adjustable transmission wire or control core is or may be employed for controlling the operation of suitable mechanism from a remote station.

In the present drawing there is shown a flexible cable 11 for housing the transmission wire or control core 10, the cable comprising a sheathing including an outer flexible covering, sleeve or tubular member 12 of plastic composition, an inner flexible sleeve or tubular member 13 also of a plastic composition through which passes the transmission wire or control core 10, the outer sleeve or flexible covering 12 preferably having spaced armor wires 14 embedded in its inner circumference and with these wires located or disposed between the outer flexible covering, sleeve or tubular member 12 and the exterior of the inner plastic sleeve or tubular member 13, and end fittings or ferrules 15 and 15a.

Each of these end fittings or ferrules 15 and 15a is shown as comprising a rigid housing or tubular part 16 having a bore therein adapted to conformably receive the end of the cable or sheathing 11 and an aligned smaller bore or opening 17 at one end which may be threaded to receive a sleeve or housing 18 and through which projects one end of the transmission wire or control core 10 extending from the adjacent end of the cable which is securely anchored in the end fitting or ferrule 15. The flexible cable may be of any desired length depending upon the distance between the operating mechanism for manually controlling movement of the transmission wire or control core 10 and any suitable mechanism to be operated or actuated thereby (not shown).

In the illustrative embodiment of the operating mechanism, the outer, internally threaded end of each end fitting or ferrule 15 and 15ᵃ is adapted to receive the threaded end of the substantially rigid sleeve or housing which may be of metal or other suitable material that requires no flexibility. As shown in Fig. 1, the end fitting or ferrule 15 is shown attached to the sleeve or tubular housing member 18 having its opposite end freely slidable or movable in a bore in a sliding block 19 to which block is affixed by a set screw or the like 21 one end of the transmission wire or control core 10.

The block 19 is slidably mounted on a fixed rod 22 bridging the opposite ends of a housing or bracket 23 of the control or operating mechanism with this block pivotally connected to one end of a link or toggle 24 and the other end of this link pivotally connected to the lower end of a control lever 25 pivotally mounted at 26 in the housing and provided with a handle 27 for manual movement by an operator to move the transmission wire or core 10 for operating or actuating any suitable mechanism to be operated or controlled thereby. A substantially rigid sleeve 28 may encompass the sleeve 18, and these sleeves affixed to the housing or bracket 23 by a set screw or the like 21.

The other end fitting or ferrule 15ᵃ for the flexible cable is similar in construction to the end fitting or ferrule 15 and is adapted to receive a substantially rigid sleeve 29 one end of which is preferably threaded for connection with the threaded opening 17 in the adjacent end of the end fitting or ferrule 15ᵃ. The other end of this sleeve is adapted to be loosely received in a bore in an arm or tubular member 31, with the transmission wire or control core 10 longitudinally slidable in the encompassing sleeve 29 but with the enclosed end 32 of the transmission wire or control core 10 affixed to and adapted to move the arm or tubular member 31 by means of a set screw or other attaching means 33.

This arm or tubular member 31 is shown pivotally connected at 34 to a link or toggle arm 35 connected to and adapted to operate or control the operation of the operated or actuated device (not shown) from a remote position or station through movement of the handle 27. If desired, the sleeve or tubular enclosure 29 for the transmission wire or core 10 may be provided with a universal connection by means of a ball 36 and fixed socket or mounting 37, as shown in Fig. 1.

As more clearly shown in Figs. 2 to 6, inclusive, the novel transmission wire or control core 10 is of unique construction and cross section whereby to decrease friction by means of decreased contact area with the encompassing sheathing or housing, to increase its carrying and retentive capacity for lubricant and to give said wire or core so formed greater strength and flexibility in operation than obtainable with transmission wires or control cores now or previously employed. All of these important objects are obtained by providing the wire or core 10 with alternately flattened portions or sections 38 and 39 of decreased cross section with the adjoining or adjacent flattened portions or sections disposed in angular arrangement disclosed as at a substantially right angle with respect to each other. Thus although the maximum width is approximately the diameter of the wire prior to flattening or reducing the cross section of the alternate, adjoining portions or sections, the resulting transmission wire or control core 10 is found to be of substantially greater strength and flexibiity than the original or initial substantially round wire.

As the control core or transmission wire 10 must remain free to move longitudinally in its encompassing sheathing or cable to assure immediate and positive control under all operating conditions, and to facilitate and maintain such freedom of movement the core or wire is lubricated prior to its insertion in the cable or sheathing, it will be apparent that providing the core or wire with the alternately flattened sides or portions of decreased cross section 38 and 39, substantial space is provided adjacent each of the connected portions for the storing of lubricant to effectively resist friction between the core or wire 10 and the interior wall of the encompassing sheathing or housing. It is also found that in general use the present novel transmission wire or control core 10 may be bent without danger of fracture or binding to a substantially greater degree or extent than the normally round wires.

From the above description and the disclosure in the drawings, it will be apparent that the present invention comprehends a novel transmission wire or control core for a remote control flexible transmission cable.

Having thus disclosed the invention, I claim:

1. In a flexible transmission cable for the control of suitable mechanism from a remote station, a continuous length of flexible wire housed within and longitudinally movable in the cable and provided with multiple longitudinally arranged and integrally connected flat sections of less thickness than width and with adjacent sections disposed at approximately a right angle to each other to provide multiple connected pockets for receiving and maintaining lubricant for reducing friction between said core and the encompassing portion of the cable.

2. In a flexible transmission cable for the control of suitable mechanism from a remote station with said cable providing a sheathing, and a flexible control core housed within and longitudinally movable in the sheathing and consisting of an integral, continuous length of wire provided with multiple connected sections of reduced thickness with adjacent sections disposed at an angle to each other to provide space about each section for receiving and pocketing lubricant for reducing friction between said core and the encompassing portion of the sheathing.

3. In a flexible transmission cable, a flexible tubular part, a control core received in said tubular part comprising a continuous length of flexible wire, said core having multiple longitudinally arranged and integrally connected sections in which the cross section has been reduced to provide substantially flat sections of substantially less thickness than width and with adjacent sections disposed at an angle to each other whereby to reduce the frictional contact between the core and the encompassing tubular part.

4. In a flexible transmission cable, a flexible tubular part, a control core in said tubular part and longitudinally movable therein, said control core consisting of a continuous and integral length of wire having multiple longitudinally connected sections of reduced cross section in one dimension with the other dimension approximating the internal diameter of the tubular part and with adjoining sections disposed at an angle to each other.

5. In a flexible transmission cable for the remote control of suitable mechanism, a control core therefor comprising a continuous and integral length of flexible wire having a longitudinally extending central axis, said wire having multiple longitudinally connected portions extending parallel with said central axis each having its opposite sides flattened to reduce the cross section of the wire with adjoining portions rotatively positioned about said axis to different angular positions relative to each other and with alternate portions disposed in the same plane.

6. In a flexible transmission cable for the remote control of suitable mechanism, a control core therefor comprising a continuous and integral length of flexible wire having a longitudinally extending central axis, said wire having multiple longitudinally connected portions extending parallel with said central axis each having two of its opposite sides flattened to reduce the cross section of the wire with adjoining portions of reduced cross section rotatively positioned about said axis at substantially a right angle to each other.

7. In a flexible transmission cable for the remote control of suitable mechanism, a flexible tubular part and a flexible control core comprising a continuous and integral length of wire housed within and projecting through the tubular part with the projecting ends of the control core connected at one end to an actuating means and at its other end to an actuated means to be operated by said control core, said wire having multiple longitudinally extending flattened sections each having a thickness substantially less than its width with the latter closely conforming to the internal diameter of the tubular part but permitting longitudinal movement of the wire within said tubular part, said sections being so constructed and arranged that adjacent sections are disposed at an angle to each other.

8. In a flexible transmission cable for the remote control of suitable mechanism, a sleeve member of a length adapted to substantially span the space between a control station and the mechanism to be controlled, and a flexible control core comprising an integral and continuous length of wire having a width conformably received in said sleeve member in which the core is longitudinally movable, and alternate, connected and angularly arranged portions of less thickness than the width of said core to limit the contact of the core with said sleeve member.

9. In a flexible transmission cable, a flexible housing of a length adapted to substantially span the space between a control station and the mechanism to be controlled, and a control core comprising a continuous and integral length of flexible wire in said housing and having its ends projecting beyond the ends of the housing, said wire having multiple longitudinally connected and alternately arranged flattened portions having a thickness substantially less than the width of the wire and with the width such that the wire is longitudinally movable in the housing without binding.

10. In a flexible transmission cable for the remote control of suitable mechanism, a control core therefor comprising a continuous and integral length of flexible wire having multiple, flattened sections with adjacent sections disposed at an angle to each other.

References Cited in the file of this patent
UNITED STATES PATENTS

| | | |
|---|---|---|
| 401,681 | Brown | Apr. 16, 1889 |
| 1,902,585 | Sanford | Mar. 21, 1933 |
| 2,128,986 | Chilton | Sept. 6, 1938 |

FOREIGN PATENTS

| | | |
|---|---|---|
| 20,194 | Australia | May 21, 1929 |
| 208,259 | Switzerland | Apr. 16, 1940 |
| 1,134,392 | France | Dec. 3, 1956 |